No. 857,053. PATENTED JUNE 18, 1907.
E. T. GREENFIELD.
JUNCTION BOX.
APPLICATION FILED JUNE 11, 1906.

WITNESSES:

INVENTOR
Edwin T. Greenfield
BY
J. C. Edmonds
ATTORNEY

UNITED STATES PATENT OFFICE.

EDWIN T. GREENFIELD, OF KIAMESHA, NEW YORK.

JUNCTION-BOX.

No. 857,053.　　　Specification of Letters Patent.　　　Patented June 18, 1907.

Application filed June 11, 1906. Serial No. 321,186.

*To all whom it may concern:*

Be it known that I, EDWIN T. GREENFIELD, a citizen of the United States, residing at Kiamesha, in the county of Sullivan and State of New York, have invented certain new and useful Improvements in Junction-Boxes, of which the following is a specification.

The object of this invention is to effect certain improvements in the construction of junction boxes of the type commonly employed in installing electric lighting appliances in a building, and to which the conductors carrying the current are run for connection to the wires of a fixture.

More particularly, my improvements relate to the means whereby the conductors entering the box are held relatively thereto so that though they are subjected to considerable strain they will not be pulled free of the box. Junction boxes of this type have been heretofore provided with clamping devices for the conductors entering the box but in these boxes either the clamping devices have been arranged in inconvenient positions or the operation of those devices has involved considerable difficulty.

My invention contemplates disposing the clamping device in the most convenient position and providing an operating means therefor which can be readily actuated when the box is mounted in position.

In accordance with my invention I mount the clamping device on the outer side of a wall of the box and so arrange the operating means therefor that it can be readily operated from within the box or on the other side of the wall on which the clamp is mounted.

Figure 1:
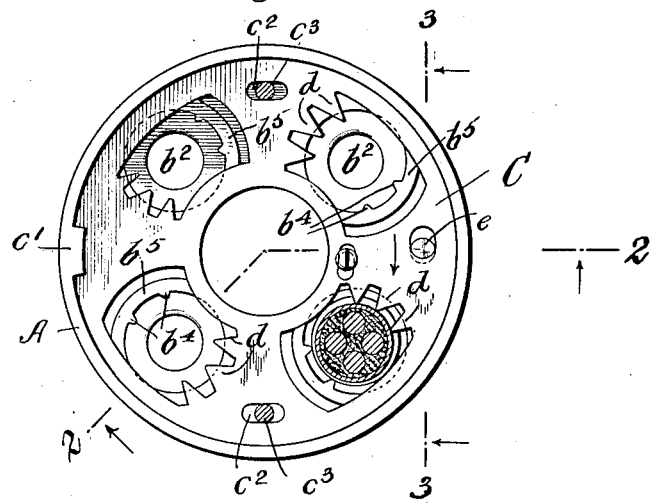
Figure 2:
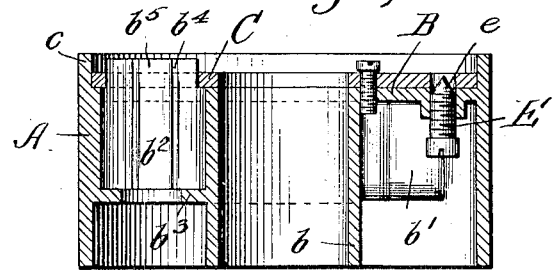
Figure 3:
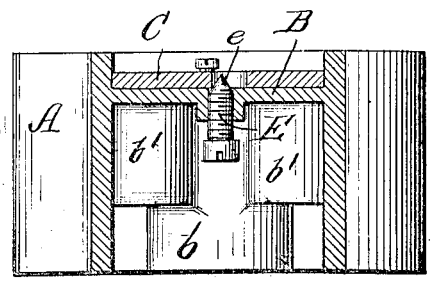

I have illustrated the preferred embodiment of my invention in the accompanying drawings in which Figure 1 is a top view of the box, Fig. 2 is a section on line 2—2 of Fig. 1 and Fig. 3 is a section on line 3—3 of Fig. 1.

In these drawings, the box illustrated is of circular form and the conductors enter through the rear wall, it being adapted more particularly for use as a ceiling box, but the features of my invention are of equal utility in one which is specially designed for use as a wall box in which case it may be of rectangular form and the conductors may enter through the side walls. The box has a cylindrical side wall A and a rear wall B which latter is provided with a central opening. An integral tubular portion $b$ depends from the rear wall B in continuation of the central opening therein forming a central passageway in which the end of the fixture is received. About this central opening are a plurality of openings for the conductors, four being shown in the present instance, and the material is formed, as at $b'$, to provide cylindrical chambers $b^2$, the ends of which are partially closed by the inwardly extending flanges $b^3$. On one side, each of these chambers $b^2$ is provided with one or more longitudinal ridges $b^4$ and on this side of each opening an upwardly extending lip $b^5$ may be provided. Lying upon the rear wall B of the box is a circular plate C confined in position in any suitable manner. The box may have a circular flange $c$ within which the plate C lies and this wall may have one or more projections $c'$ turned over to hold the plate against dropping out. Or, the plate may have slots $c^2$ therein and screws $c^3$ may extend therethrough and into the wall B. The plate C has a central opening cut therethrough so as not to obstruct the central opening through the box for the end of the fixture and around this opening are a number of openings corresponding to the number of chambers $b^2$. On one side of each of these openings, teeth $d$ are formed on plate C, these being on the side of the openings away from the ridges $b^4$. Between two of the chambers $b^2$ a threaded opening is provided in the rear wall B to receive a screw E. This screw has a conical end $e$. In the plate C is an opening into which the end of screw E may enter. As thus constructed, the screw E may be withdrawn somewhat and the plate C moved around until the teeth $d$ do not overlie the chambers $b^2$. The box and fixture may then be mounted in position in the usual manner and the conductors drawn into and through the chambers $b^2$. These conductors are usually provided with an armoring of spirally formed strip and this armoring may be removed from the end of each conductor back to such a point that its end will lie against the flange $b^3$, the insulated wires themselves extending beyond this point for connection to the wires of the fixture. When the parts are in this relation, the screw E is moved axially by turning it with a screw driver and its conical end engages the wall of the opening in plate C. As the screw E is advanced more and more the plate is turned on its axis by coaction with the conical end $e$ of screw E, the plate being guided by the wall $c$ and screws $c^3$, until the teeth $d$ thereof are brought into hard engagement with the conductor or conductors, as shown in Fig. 1. The conductors are thus gripped tightly between the teeth $d$ and the ridges $b^4$ and are held so firmly that they will not be pulled away from the box. The lips $b^5$ preclude bending of the conductor due to the pressure of teeth $d$. By this construction, the clamping device is disposed on the outer side of the wall of the box and occupies little space and yet it may be readily operated by the workman installing the box after the latter is mounted in position. If the box is secured in an opening in a ceiling, the workman may properly position the conductors and other parts and when all are correctly arranged he may operate the clamping device from below to grip the conductors.

Having described my invention what I claim as new and desire to secure by Letters Patent is:

1. A junction box having a rotatable clamping device supported on one side of a wall of the box and means for rotating said device from the other side of said wall, substantially as described.

2. A junction box having a clamping device supported on one side of a wall of the box and rotatable relatively thereto, guides for said device, and means for rotating said device from the other side of said wall, substantially as described.

3. A junction box having a clamping plate supported on one side of a wall of the box, said plate having openings therein, teeth formed on a side of each of said openings, and means for moving said plate operated from the opposite side of said wall, substantially as described.

4. A junction box having a clamping plate supported on one side of a wall of the box, said plate having openings therein, guides for said plate, teeth formed on a side of each of said openings, and means for moving said plate operated from the opposite side of said wall, substantially as described.

5. A junction box having openings through a wall thereof for conductors, a plate supported on said wall and having corresponding openings therethrough, means for retaining said plate in position permitting predetermined movement thereof relatively to said wall, and means for moving said plate operated from the opposite side of said wall, substantially as described.

6. A junction box having openings through a wall thereof for conductors, a clamping device having corresponding openings therethrough supported upon one side of a wall of the box, and means operated from the other side of said wall for causing said clamping device to grip a conductor passing through said openings, substantially as described.

7. A junction box having a clamping plate supported upon a wall thereof, said plate having an opening therein and a screw located in an opening in said wall and having a head at one end and at the other an inclined portion adapted to enter said opening, substantially as described.

8. A junction box having side and rear walls and openings in said rear wall, a clamping plate having corresponding openings supported on said rear wall, teeth formed on said plate at one side of each of said openings and a screw passing through said rear wall and having an inclined portion adapted to engage the wall of an opening in said plate to move the latter relatively to said wall, substantially as described.

9. A junction box having openings in a wall thereof, a clamping device having corresponding openings therethrough mounted for rotation on one side of a wall of the box, and means operated from the other side of said wall for rotating said clamping device and causing the same to grip a conductor passing through said openings, substantially as described.

10. A junction box having openings for conductors therein, a clamping device having corresponding openings therein supported on a wall of said box and means for rotating said device and causing the same to grip conductors passing through said openings, substantially as described.

This specification signed and witnessed this 8th day of June, 1906.

EDWIN T. GREENFIELD.

Witnesses:
WILLIAM T. RUETE,
CHAS. E. WILSON.